United States Patent [19]

Hawthorne

[11] Patent Number: 4,662,218
[45] Date of Patent: May 5, 1987

[54] WELL LOGGING DEVICE AND METHOD

[76] Inventor: M. Marion Hawthorne, Rte. 2, Box 141 H, Granbury, Tex. 76048

[21] Appl. No.: 672,885

[22] Filed: Nov. 19, 1984

[51] Int. Cl.⁴ .............................................. E21B 47/00
[52] U.S. Cl. ....................................... 73/155; 250/260
[58] Field of Search ......................... 73/155, 151, 152; 250/256, 259, 260; 367/25, 86; 166/250

[56] References Cited

U.S. PATENT DOCUMENTS

| | | | |
|---|---|---|---|
| 2,674,877 | 4/1954 | Silverman et al. | 73/155 |
| 2,733,605 | 2/1956 | Buck | 73/155 X |
| 2,936,614 | 5/1960 | Godbey | 73/155 |
| 3,056,463 | 10/1962 | Summers | 367/25 |
| 3,255,347 | 6/1966 | Cobb et al. | 73/155 X |
| 3,389,257 | 6/1968 | Caldwell et al. | 250/266 |
| 3,402,294 | 9/1968 | Bargainer, Jr. | 250/261 |
| 3,406,284 | 10/1968 | Young | 250/260 |
| 3,932,747 | 1/1976 | Sherman | 250/256 |
| 4,005,290 | 1/1977 | Allen | 250/266 |
| 4,314,476 | 2/1982 | Johnson | 73/155 |
| 4,452,077 | 6/1984 | Siegfried, II | 73/155 |

Primary Examiner—Stewart J. Levy
Assistant Examiner—Scott M. Oldham
Attorney, Agent, or Firm—Charles D. Gunter, Jr.

[57] ABSTRACT

A device and method are shown for detecting fluid flow in a well bore. A downhole device suspended from a cable drum is used to sense the movement of fluid in the borehole. The movement of the downhole device is then synchronized with the fluid movement and the speed and direction of movement of the cable is measured at the well surface to provide a direct indication of the direction and rate of the fluid flow.

5 Claims, 3 Drawing Figures

WELL LOGGING DEVICE AND METHOD

BACKGROUND OF THE INVENTION

1. Field of the Invention

This invention relates to well borehole logging devices of the type designed to determine certain characteristics of the borehole for petroleum exploration and production, including the velocity of the fluid movement in the borehole.

2. Description of the Prior Art

Prior well logging devices and methods are known which feature a signal emitter and one or more signal detectors. U.S. Pat. No. 4,005,290, entitled "Neutron-Neutron Logging", issued Jan. 25, 1977, shows a borehole logging tool which utilizes a radioactive emitter and a plurality of neutron detectors. U.S. Pat. No. 3,056,463, entitled "Sonic Borehole Logging Devices", issued Oct. 2, 1962, shows an acoustic logging system which has a sonic emitter and acoustic transducers for detecting the emitted signal.

The velocity of fluid movement in the borehole is one characteristic of interest in well logging. By sampling the fluid velocity at various intervals along the borehole, the operator can obtain an indication of whether different perforated zones are producing, or whether fluid is being lost to a porous zone in the well bore. In the past, the above types of well logging devices were used in basically two ways to obtain an indication of the well fluid velocity. One method involved lowering a downhole device to a desired location within the well bore on a supporting cable. A signal was then produced from an emitter at one end of the downhole device and the signal was tracked by two or more detectors as the signal and associated well fluid moved past the detectors. The downhole device was held stationary by the supporting cable. Since the cross sectional area of the borehole was known and the distance between the detectors was known, the time taken for the signal to pass the detectors gave an indication of the fluid velocity or flow rate.

In the other method, the downhole device would typically be provided with a signal emitter and a single detector. The device would be lowered to a desired location and the signal emitted. The device would then be run ahead of the signal for a given distance, i.e., 50 feet, and the signal would be detected as it passed the device. Once again, since the distance of travel was known, and the time taken, the velocity or flow rate could be approximated.

While the above methods have been extensively utilized to obtain information regarding the characteristics of producing formations, formations used to store products, and formations used to dispose of waste fluids, several problems exist with their use. Certain of the prior methods required precise calibration of the instruments utilized. Additional difficulties resulted from the sensitivity of the methods employed to variations in temperature and pressure within the well bore. Where a stationary downhole device was utilized, only a discrete interval of the well bore could be sampled.

SUMMARY OF THE INVENTION

In the device and method of the present invention, the movement of a downhole tool which is suspended from a cable and drawworks is synchronized with the movement of fluid flow within the well bore. Once the downhole device and borehole fluid are moving together, the speed of the cable movement at the surfce is read, giving a direct indication of the velocity of the fluid.

The method is carried out by positioning a downhole device into the borehole by suspending the device from a cable at the well surface. The device then senses the fluid movement downhole. The sensed information obtained from the downhole device is relayed to a control means which controls the speed and direction of the cable movement. The speed and direction of the cable movement are adjusted with the control means so that the downhole device tracks the movement of the fluid in the well. The velocity of the cable movement at the surfac is then measured to determine the velocity of the well fluid.

Because the downhole device moves along with the fluid in the well bore, a longer interval can be continuously sampled. Since the downhole device simply detects fluid movement, precise calibration of sensitive instruments is not involved and variations due to temperature and pressure are not a problem.

Additional objects, features and advantages will be apparent in the written description which follows.

DETAILED DESCRIPTION OF THE INVENTION

Figure 3:
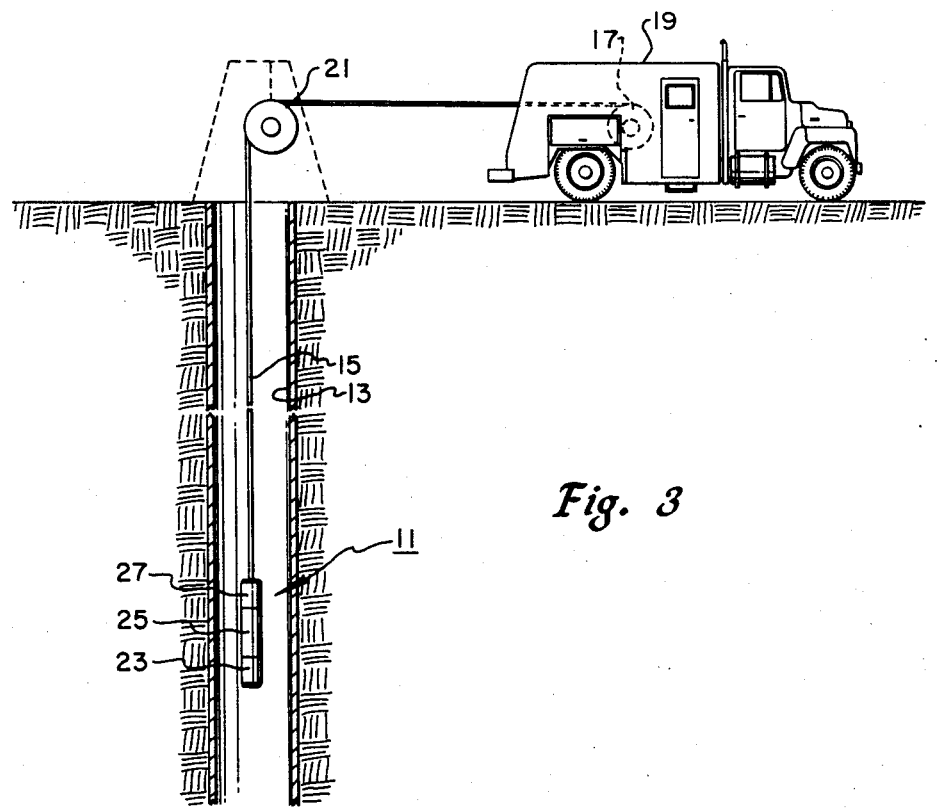
FIG. 3 is a simplified schematic view of a prior art well logging technique.

In order to best illustrate the novel features of the present invention, reference will first be had to FIG. 3 which illustrates a prior art technique. In the method of FIG. 3, a downhole device, designated generally as 11, is lowered into a borehole 13 by means of a cable 15. The cable 15 is reeled off a conventional cable drum 17 located on a service truck and may pass over one or more intermediate sheaves 21 on the drilling or workover rig.

The downhole device 11 typically features a signal emitter 23, at one end thereof, and one or more signal detectors 25, 27. To measure the fluid velocity, a signal is first given off by the emitter 23. This could comprise, for instance, a radioactive material which would be pumped out of the emitter 23 upon current being applied through the cable 15 from the surface. As the radioactive material mixes with the surrounding well fluid and flows pass the detectors 25, 27, the time taken for the material to pass the detectors 25, 27 can be measured. Since the distance between the detectors 25, 27 is known and the time taken to travel this distance has been determined, the fluid velocity can be calculated.

In other prior art methods, a signal emitter and single signal detector were utilized. Once again, the device would be positioned as shown in FIG. 3 and a signal would be emitted. The device 11 would then be run ahead of the signal a fixed distance, i.e., 50 feet, and the time taken for the signal to reach the detector would be measured. Knowing the distance traveled and the time, the fluid velocity could again be approximated.

Figure 1:
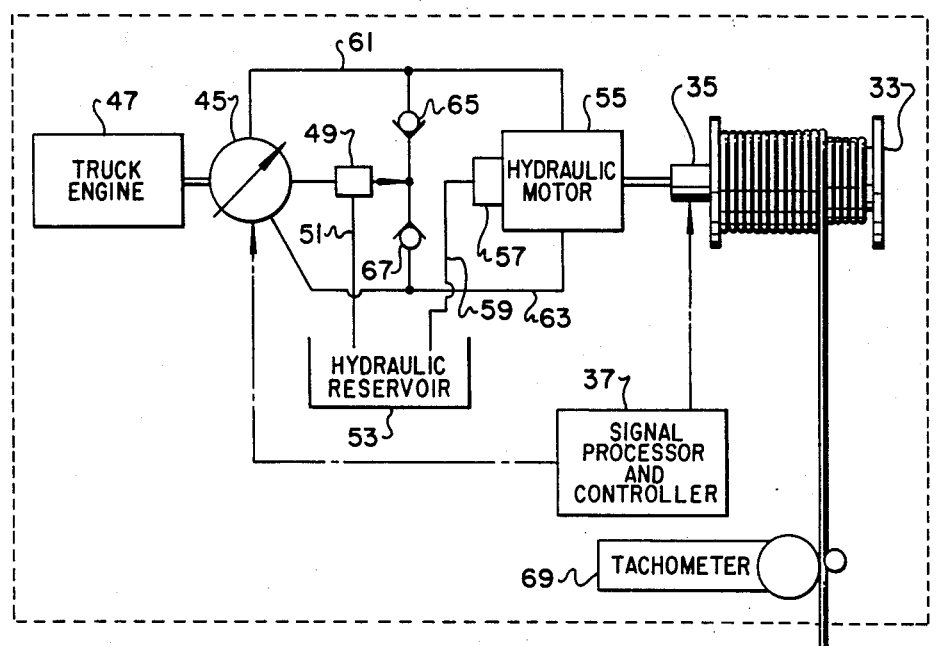
FIG. 1 is a schematic view of the well logging system utilized to practice the method of the invention.
Figure 1:
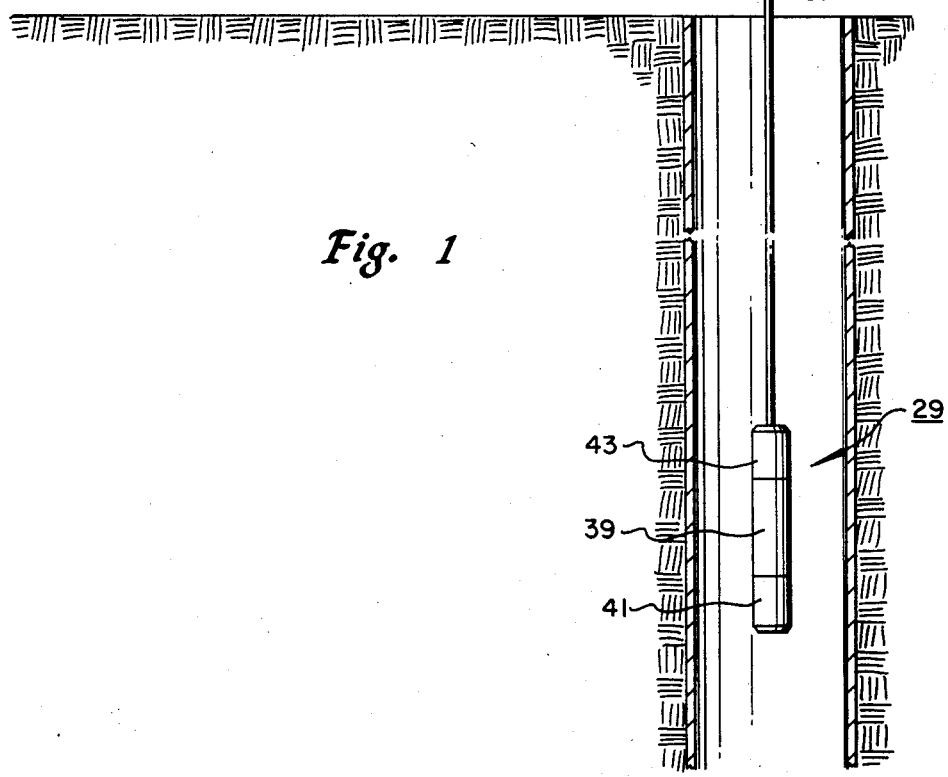

FIG. 1 illustrates the device and method of the present invention. A downhole device, designated generally as 29 is again suspended from a cable 31 which is reeled off a conventional cable drum 33. The cable 31, in addition to supporting the downhole device 29, has a conductor core (not shown) insulating from an outer sheath, thus constituting a two conductor line. The cable drum shaft is provided with a pair of slip rings 35 with associated brushes, through which electric signals are transmitted from the cable to a signal processor and controller 37.

The downhole device 29 has a signal emitter 39 which is located between a pair of equidistantly spaced signal detectors 41, 43. The signal emitter and detectors can be of any desired type. For instance, the emitter can constitute a radioactive material emitter and the signal detectors 41, 43 can constitute conventional radiation detectors. Other types of signal emitters and detectors could be utilized as well, including a heating element as the emitter and thermistors as the detectors, or a sonic emitter and sonic transducers as the detectors. In the case of a sonic emitter, the sonic transducers would provide a readout of relative fluid movement by employing tyhe Doppler effect. It is only necessary that the downhole device be capable of sensing fluid movement in the borehole.

The downhole device is used to sense the fluid movement by synchronizing the movement of the downhole device with the movement of the borehole fluid. Thus, in the case of a radioactive emitter, a radioactive material would be discharged from the emitter 39 upon receiving an electrical signal through the cable 31. The detector 41, 43 would be utilized to sense the fluid movement, by sensing the relative proximity of the radioactive material, and this information would be relayed through the slip rings 35 to the signal processor 37 which controls the speed and direction of the cable movement. In other words, the movement of the downhole device 29 would be synchronized with the movement of the borehole fluid so that the counting rates received from the detectors 41, 43 would be approximately equal. If detector 43 indicates a higher relative background count than detector 41, this would indicate that the radioactive material is closer to the detector 43, and the signal processor-controller causes the take up speed of the drum 33 to be increased. If the background count from the detector 41 is higher, this would indicate that the radioactive material is approaching detector 41 and the signal processor-controller causes the cable 31 to be played-off drum 33 at a faster rate.

The speed of the cable drum 33 is thus automatically controlled by the sensed signals from the downhole device 29 to make the downhole device 29 follow the fluid flow in the borehole. The means for adjusting the cable speed and direction is illustrated within dotted lines in FIG. 1. This can conveniently be accomplished by utilizing a variable displacement pump 45 which would be driven by the truck engine 47. The variable displacement pump 45 is of the known type and features a charge pump 49 which draws hydraulic fluid from a reservoir 53 through a suction line 51. The variable displacement pump 45, in turn, drives a hydraulic motor 55. The hydraulic motor 55 has a shuttle valve 57 which dumps hydraulic fluid through a return line 59 to the reservoir 53.

A pair of fluid conduits 62, 63 connect the pump 45 to the motor 55. Each fluid conduit 61, 63 is connected to a check valve 65, 67, respectively. The pump 45 contains a swash plate which operates in the conventional manner. If the plate is in a neutral position, no fluid is pumped through either conduit 61, 63. If the plate is moved from the neutral position, hydraulic fluid is pumped through one of the conduits 61, 63, making that conduit the high pressure side of the system. The respective check valve 65, 67 prevents the flow of fluid through the low pressure side of the system.

Although mechanical servo control of the swash plate in such pumps has been known for quite some time, electronic servo controls are becoming more popular. For instance, U.S. Pat. No. 3,667,225, entitled "Hydrostatic Drive and Control Systems Therefore", issued June 6, 1972 to L. P. Karman, illustrates an electro-hydraulic control system, the disclosure of which is hereby incorporated by reference. In the disclosed system, a hydraulic motor is controlled from a variable displacement pump having a movable swash plate. The position of the swash plate is controlled by an electrical control circuit including a series of inputs which represent either a desired position of the motor or a desired pump output.

In the method of the invention, utilizing a radioactive signal emitter, the relative counting rates of the detectors 41, 43 are sensed and passed to the signal processor 37. The processed signals are fed to the control portion of the electronic circuit which, in turn, controls the position of the swash plate in the pump 45. In this way, the motor 55 and cable speed are controlled to speed up or slow down the cable movement. Once the movement of the downhole device 29 is synchronized with the movement of fluid in the borehole, a digital tachometer 69 is utilized to measure the line speed of the cable 31. The speed measurement taken by the tachometer 69 is converted to a D.C. voltage and fed to the electrical servo portion of the signal processor and controller 37 to provide a closed-loop system for controlling the cable speed and direction. The digital tachometer 69 provides a direct readout of the cable speed since the magnitude of the D.C. voltage produced corresponds to the relative speed of the cable and polarity changes of the current indicate changes in direction of the cable travel.

Figure 2:
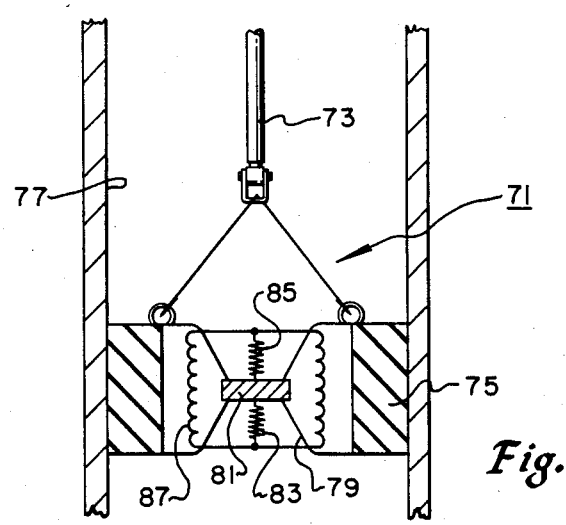
FIG. 2 is a simplified, cross-sectional view of one sensing means utilized to ense fluid movement in the method of the invention.

FIG. 2 illustrates an alternative downhole device, designated generally as 71 which can be utilized to sense fluid movement in the borehole. The device 71 is again suspended from a cable 73 which passes to an identical drum and control system of the type illustrated in FIG. 1. The downhole device 71 features a packer element 75 capable of forming a seal against and capable of sweeping the borehole 77. The device also includes a central flow passage 79 which houses a sensing means which is actuable by fluid flow through the central flow passage to produce a signal indicative of fluid movement. The sensing means could comprise, for instance, a linear transducer in the form of an iron slug 81 biased toward a central position within the flow passage by coil springs 83, 85. An electrical coil 87 surrounds the flow passage and detects relative up and down movement of the iron slug 81 by changes in the resulting magnetic field within the coil 87.

The downhole device 71 would be lowered into the borehole, as before, and the movement of the device would be synchronized with the movement of fluid in the borehole. If the fluid pressure below the slug 81 was greater than the pressure above the slug, the slug would move upwardly and a signal would be detected at the surface through the processor 37 indicating that the take up speed of the drum 33 should be increased. If the pressure above the slug 81 was greater than the pressure below the slug, a downward movement of the slug would be detected and the processor-controller 37 would decrease the take-up speed of the drum 33. It will be understood that bellows or other sensing means can be utilized for the linear transducer 81 within the packer flow passage 79.

The downhole device 71 has the advantage of sweeping the well bore to provide a cmore accurate picture of the fluid velocity since variations in velocity across the cross-sectional area of the borehole are eliminated.

While the invention has been shown in only two of its forms, it is not thus limited but is susceptible to various changes and modifications without departing from the spirit thereof.

I claim:

1. A method of measuring the movement of fluid in a wall borehole, comprising the steps of:

positioning a downhole device into the borehole by suspending the device from a cable at the well surface, the device being provided with a signal emitter and two longitudinally spaced signal detectors each signal detector being operable to output a readout proportional to the proximity of a signal emitted from the signal emitter;

emitting a signal from the signal emitter and simultaneously sensing the signal with each of the signal detectors;

relaying the sensed information obtained from the downhole device up the cable to a control means which controls the speed and direction of the cable movement;

adjusting the speed and direction of the cable movement based upon the proximity of the sensed signal to the respective signald etector on the downhole device so that the readouts from the two signal detectors are approximately equal, whereby the movement of the downhole device tracks the movement of the well fluid; and measuring the velocity of the cable movement at the surface to determine the velocity of the well fluid.

2. The method of claim 1, wherein said signal emitter is a source of radioactive material and the signal detectors are radiation detectors which provide a readout in the form of a counting rate indicative of the relative proximity of the radioactive material.

3. The method of claim 1, wherein said signal emitter is a heating element which serves as a source of heat and said signal dtectors are thermistors which provide a readout indicative of the relative proximity of the heat emitted by the heating element.

4. The method of claim 1, wherein said signal emitter is a sonic emitter which serves as a source of sound waves and said signal detectors are sonic transducers which provide a readout indicative of the relative proximity of the sound emitted by the sonic emitter.

5. The method of claim 1, further comprising the steps of:

suspending the downhole device and cable from a cable drum located at the well surface;

providing a hydraulic motor for driving the cable drum, the hydraulic motor being driven by a variable displacement hydraulic pump; and adjusting the speed and direction of the cable movement by electronically controlling the variable displacement pump with an electronic control means which interprets the sensed information obtained from the downhole device.

* * * * *